United States Patent [19]
Kang et al.

[11] Patent Number: 5,960,195
[45] Date of Patent: Sep. 28, 1999

[54] INTELLIGENT VOLATILE MEMORY INITIALIZATION

[75] Inventors: Ki B. Kang, Centreville, Va.; Michael Gilbert, Germantown, Md.

[73] Assignee: Samsung Electronics Co., Ltd., Suwon, Rep. of Korea

[21] Appl. No.: 08/657,423

[22] Filed: Jun. 3, 1996

[51] Int. Cl.[6] .................................................. G06F 9/445
[52] U.S. Cl. .......................................... 395/651; 395/652
[58] Field of Search ................................... 395/651, 652, 395/670; 711/166

[56] References Cited

U.S. PATENT DOCUMENTS

| | | |
|---|---|---|
| 4,831,513 | 5/1989 | Kanazawa ................................ 711/166 |
| 5,014,218 | 5/1991 | Crain et al. . | 
| 5,634,000 | 5/1997 | Wicht . |
| 5,673,388 | 9/1997 | Murthi et al. . |

FOREIGN PATENT DOCUMENTS

WO 89/0995  10/1989  WIPO .

*Primary Examiner*—Majid A. Banankhah
*Attorney, Agent, or Firm*—Jones, Volentine, Steinberg & Whitt, L.L.P.

[57] ABSTRACT

A volatile memory initialization systems differentiates between a first class of reset causes requiring memory initialization and a second class of reset causes not requiring memory initialization. A register records the first and second classes of reset causes. A volatile memory initialization function is performed when a reset of the first class of reset causes is read from the register. The volatile memory initialization function is bypassed when a reset of the second class of reset causes is read from the register.

17 Claims, 2 Drawing Sheets

INTELLIGENT VOLATILE MEMORY INITIALIZATION

BACKGROUND OF THE INVENTION

1. Field of the Invention

The present invention generally relates to initialization schemes, and more particularly, to an intelligent volatile memory scheme that performs or bypasses the volatile memory initialization function in response to different reset causes.

2. Description of the Prior Art

Volatile memory devices such as Dynamic Random Access Memory (DRAM) and Static Random Access Memory (SRAM) sustain data only while an appropriate level of power is supplied to the memory chips. Moreover, volatile memory devices have a higher failure rate relative to non-volatile memory or non-memory devices. Data loss and/or data corruption caused by a loss of power supplied to the memory device or a memory device failure are thus a concern to memory manufacturers, system integrators, and end users alike.

It is common practice, therefore, to add device failure detection logic, such as parity error detection, when designing memory sub-system circuitry. Parity error detection works in the following way. Whenever a memory device is being written, a parity bit or bits is generated and written in the memory at the same address location. When the memory device is thereafter read, a new parity bit or bits is generated based on the data read. The generated or read parity bit is compared to the parity bit stored during the last write operation—if they are not the same value a parity error is flagged.

After power-up, the memory sub-system contains neither valid data nor valid parity bits. Since a read operation at this point may cause a parity error, the entire memory needs to be initialized prior to its first use. This is accomplished by writing once in the beginning with valid data after the system is reset. However, this initialization operation can take anywhere from a few seconds to tens of seconds, depending on several factors, including the processor's operation speed, the access time of the memory device, and the size of the memory.

This disadvantage, particularly the dependence on the memory size, is becoming more and more noticeable as newer, larger application programs are introduced that require greater amounts of memory to run.

A second disadvantage of the initialization operation is that the prior contents of the memory are not preserved, which can be frustrating and inconvenient. For example, if a large file is down loaded to memory from a host system, it is necessary to down load the same large file every time the system is reset. This is because conventional reset schemes initialize the memory, regardless of what caused the system to reset.

In light of the foregoing, there exists a need for an apparatus and method for differentiating among the causes for the system to reset and implementing the memory initialization operation only when a power-on reset (POR), brown-out, or other like condition occurs.

SUMMARY OF THE INVENTION

The present invention is directed to an intelligent volatile memory initialization (IVMI) scheme, which substantially obviates one or more of the problems due to the limitations and disadvantages of the related art.

In general, the IVMI scheme utilizes the hardware generated reset status register to differentiate power-on reset (POR), brown-out conditions, or like condiditons from other types of reset in digital logic. The software associated with the hardware performs memory initialization only if the cause of the reset is due to a power-on reset (POR) or brown-out. This IVMI scheme therefore automates the initialization task of all volatile memory devices. This not only saves time by not having to initialize the memory after each reset, but also provides a mechanism for volatile memory nondestructive reset.

To achieve these and other advantages and in accordance with the purpose of the invention, as embodied and broadly described, the invention provides for a volatile memory initialization system for differentiating between a first class of reset causes requiring memory initialization and a second class of reset causes bypassing memory initialization, comprising: a register means for recording first and second classes of reset causes; and means for performing volatile memory initialization responsive to the register means, wherein the volatile memory is initialized upon reading one of the first class of reset causes from the register means, and wherein the volatile memory initialization is bypassed upon reading one of the second class of reset causes from the register means.

In another aspect, the invention provides for a method for differentiating between a first class of reset causes requiring memory initialization and a second class of reset causes bypassing memory initialization, comprising the steps of: (1) recording first and second classes of reset causes in a register; (2) reading said register; (3) performing volatile memory initialization upon reading one of the first class of reset causes from the register; and (4) bypassing the volatile memory initialization step upon reading one of the second class of reset causes from the register means.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to an intelligent volatile memory initialization scheme utilizing a combination of hardware and software to differentiate power-on reset (POR) and brown-out conditions from other types of reset in digital logic. Memory initialization is only performed if the cause of the reset is due to a POR, a brown-out, or other like power related condition. The hardware apparatus and method described herein may be utilized in any number of host network managers, computer systems, or other like systems.

Figure 1:
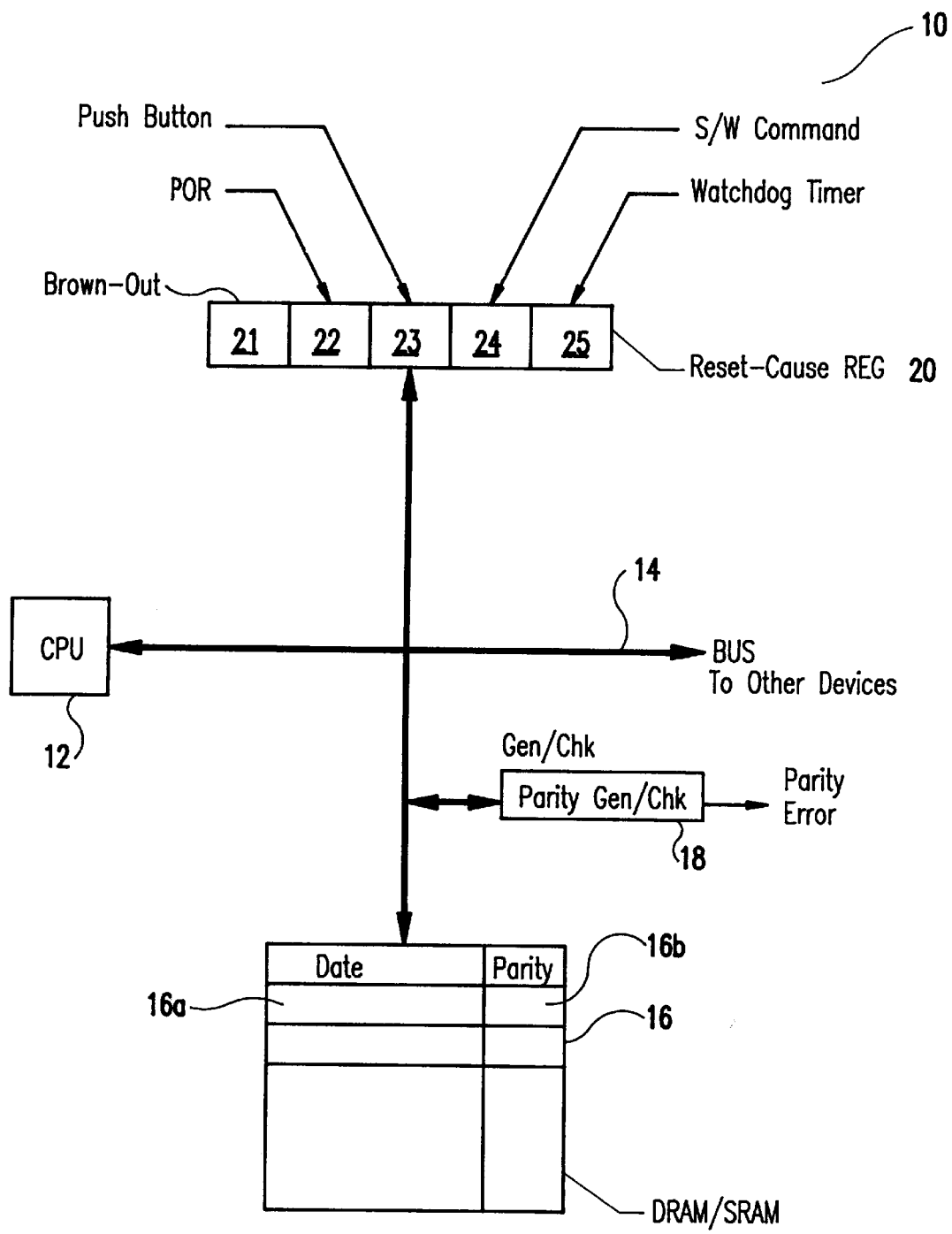
FIG. 1 is a functional block diagram of the reset cause register of the present register and its associated processor and memory components.

FIG. 1 illustrates the hardware configuration 10 incorporating the intelligent reset method of the present invention. A conventional central processing unit (CPU) 12 is connected to the other system components via bus 14. The CPU 12 and bus 14 may be any of the conventional commercial products or they may be proprietary or custom components. The memory device 16 may be either DRAM or SRAM with standard data 16a and parity 16b fields. The data fields can be any bit length and the parity scheme may be single bit or multiple bit.

A parity generator/parity checker 18 generates the parity bit when the memory device is being written, and it is stored at the same address location. When the memory device is read, a new parity bit is generated based on the data read. The read parity bit is compared to the parity bit previously stored during the last write operation—if they are not the same value a parity error is flagged.

A reset-cause register 20 has been integrated into the system. A network or computer system may be reset for a variety of reasons, both hardware and software related. In conventional systems, reset schemes initialize the memory, regardless of what caused the system to reset. In the present invention, those resets that do not affect the volatile memory are distinguished from those resets that do affect the volatile memory. The reset cause register 20 illustrates five common causes of system restarts. It is understood, however, that reset cause registers 20 having greater than or less than five causes are contemplated within the practice of this invention.

As shown in FIG. 1, the five causes are brown-outs 21, power-on resets (POR) 22, push button 23, software command 24, and watchdog timer 25. Each of these are described in greater detail below.

Brown-out 21 refers to a the situation where the supply voltage tolerance of the particular system incorporating the volatile memory 16 is exceeded, causing a high or low voltage condition. For example, with a supply voltage of 5 volts and a tolerance of +/−0.25 volts, a brown-out situation would occur for voltages greater than 5.25 volts or less than 4.75 volts. A brown-out may cause corruption or a loss of the data in volatile memory 16, therefore, the volatile memory should be initialized by writing valid data to the memory.

Power-on reset (POR) 22 is simply restarting the system after a loss of power, whether due to shutting the machine down or by a lightening strike that trips the voltage protection circuit, or some other like cause. As stated previously, a loss of power will cause a loss of data in the volatile memory 16. In that case, on power-up the memory must be initialized.

Push button 23 refers to a reset button or switch on the machine that is cycled to reset the system while maintaining power to the machine. In such a push button reset operation 23, there is no need to initialize the memory as power has been continuously supplied to the system. The data in volatile memory 16 merely needs to be verified upon system restart. Verification means reading only that portion of the memory containing the program last used, and verifying the checksum to ensure data integrity.

Software command 24 refers to the situation where the software is allowed to perform a hardware level reset. By writing the correct command sequence to the reset circuit, the board will be forced to reset. In this case there is no need to initialize the entire memory as power has been continuously supplied to the system during this software reset. The data in volatile memory 16 merely needs to be verified after the program is restarted.

Watchdog or bus timer 25 refers to the situation where the central processing unit, for example, is stuck in a loop. After a certain designated time period in the inadvertent loop, the timer automatically initiates a reset of the processor causing the system to reset. Again, there is no need to initialize the memory as power has been continuously supplied to the system during this processor reset. The data in volatile memory 16 merely needs to be verified after the program is restarted.

From the above causes, it can be seen that those affecting the power supply to the volatile memory 16 (e.g., brown-out 21 and power-on reset 22) would require memory initialization upon power-up and prior to first use. The remaining causes (e.g., push button 23, software command 24, and watchdog timer 25)—while they affect the operation of the hardware and software of the system—do not affect the power supply to the volatile memory 16. In this case a data verification operation would be performed rather than a complete memory initialization operation.

Figure 2:
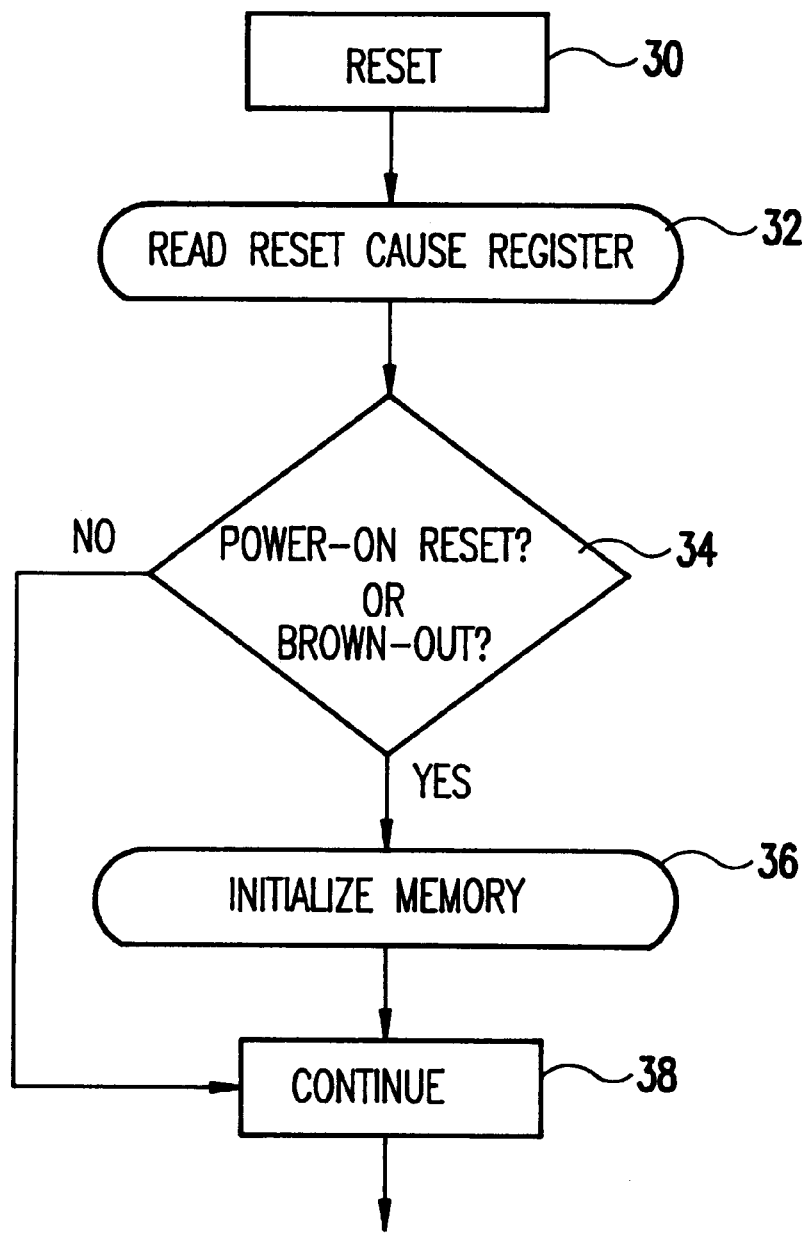
FIG. 2 is a flow diagram of the method of the present invention.

FIG. 2 illustrates the sequence of steps of the present invention employing the reset cause register 20. After a reset 30 occurs, the reset is written to reset cause register 20. In block 32 the reset cause register 20 is read. If the cause is a brown-out or power-on reset as shown in decision block 34, the memory initialization operation 36 will be performed. If the cause is something other than a brown-out or power-on reset as shown in decision block 34, the memory initialization operation 36 will be bypassed and the system operation 38 will continue after a verification of the data in the volatile memory.

The present invention, therefore, provides for a way to differentiate reset causes and separate them into two classes; those requiring memory initialization and those where the memory initialization process may be bypassed. This not only saves time by not having to initialize the volatile memory after every reset, but it also provides a mechanism for preserving the volatile memory state during non-power related resets. Preserving the volatile memory state may be especially useful for software debugging operations as the non-destructive reset does not overwrite software already on the board.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A volatile memory initialization system for differentiating between a first class of reset causes requiring memory initialization and a second class of reset causes not requiring memory initialization, comprising:

means for determining a cause of a system reset;

a register comprising a plurality of reset cause flags wherein a one of said reset cause flags corresponding to said determined reset cause is set;

means for performing volatile memory initialization after reading said register, wherein said volatile memory is initialized after reading said register and said one reset cause flag set therein is one of said first class of reset causes, and wherein said volatile memory initialization is bypassed after reading said register and said one reset cause flag set therein is one of said second class of reset causes; and means for verifying data in said volatile memory when said volatile memory initialization is bypassed.

2. A system as in claim 1, wherein said first class of reset causes comprises at least one of power-on resets and brown-outs.

3. A system as in claim 1, wherein said second class of reset causes comprises at least one of push button resets, software commands, and watchdog or bus timers.

4. A method for differentiating between a first class of reset causes requiring memory initialization and a second class of reset causes not requiring memory initialization, comprising:

determining a cause of a system reset;

setting one of a plurality of reset cause flags, corresponding to said cause of a system reset, in a register;

reading said register;

performing volatile memory initialization after reading said register and said reset cause flag set therein is one of said first class of reset causes;

bypassing the volatile memory initialization after reading said register and said reset cause flag set therein is one of said second class of reset causes; and verifying data in said volatile memory when said volatile memory initialization is bypassed.

5. A method as in claim 4, wherein said performing step is carried out in response to reading the first class of reset causes comprising at least one of power-on resets and brown-outs.

6. A method as in claim 4, wherein said bypassing step is carried out in response to the second class of reset causes comprising at least one of push button resets, software commands, and watchdog or bus timers.

7. An volatile memory initialization system, comprising;

a reset cause register having a plurality of reset cause flags, wherein each reset cause flag provides a unique reset cause indication;

a system bus connected to said reset cause register; and a central processing unit connected to said bus for reading said reset cause register to determine a reset cause, said central processing unit performing volatile memory initialization when said reset cause belongs to a first class of reset causes requiring memory initialization, and bypassing volatile memory initialization when said reset cause belongs to a second class of reset causes wherein memory initialization may be bypassed.

8. The volatile memory initialization system of claim 7, wherein said reset cause register includes a power-on reset flag providing a power-on reset indication.

9. The volatile memory initialization system of claim 7, wherein said reset cause register includes a brown-out reset flag providing a brown-out reset indication.

10. The volatile memory initialization system of claim 7, wherein said reset cause register includes a push-button reset flag providing a push-button reset indication.

11. The volatile memory initialization system of claim 7, wherein said reset cause register includes a software command reset flag providing a software command reset indication.

12. The volatile memory initialization system of claim 7, wherein said reset cause register includes a watchdog timer reset flag providing a watchdog timer reset indication.

13. The volatile memory initialization system of claim 8, wherein said reset cause register includes a brown-out reset flag providing a brown-out reset indication.

14. The volatile memory initialization system of claim 13, wherein said reset cause register includes a push-button reset flag providing a push-button reset indication.

15. The volatile memory initialization system of claim 14, wherein said reset cause register includes a software command reset flag providing a software command reset indication.

16. The volatile memory initialization system of claim 15, wherein said reset cause register includes a watchdog timer reset flag providing a watchdog timer reset indication.

17. The volatile memory initialization system of claim 16, wherein, the power-on reset indication and the brown-out reset indication belong to the first class of reset causes, and the push-button reset indication, the software command reset indication, and the watchdog timer reset indication belong to the second class of reset causes.

* * * * *